United States Patent
Yamashita et al.

(10) Patent No.: US 12,489,995 B2
(45) Date of Patent: Dec. 2, 2025

(54) PHOTOGRAPHING DEVICE AND CONTROL METHOD THEREOF

(71) Applicant: BEIJING XIAOMI MOBILE SOFTWARE CO., LTD., Beijing (CN)

(72) Inventors: Yuichiro Yamashita, Tokyo (JP); Yusuke Oguro, Tokyo (JP); Atsushi Kobayashi, Tokyo (JP)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 18/289,545

(22) PCT Filed: Apr. 25, 2022

(86) PCT No.: PCT/CN2022/089097
§ 371 (c)(1),
(2) Date: Nov. 3, 2023

(87) PCT Pub. No.: WO2023/206030
PCT Pub. Date: Nov. 2, 2023

(65) Prior Publication Data
US 2024/0244346 A1    Jul. 18, 2024

(51) Int. Cl.
*H04N 25/618* (2023.01)
*H04N 25/46* (2023.01)

(52) U.S. Cl.
CPC .......... *H04N 25/618* (2023.01); *H04N 25/46* (2023.01)

(58) Field of Classification Search
CPC ...... H04N 25/618; H04N 25/46; H04N 23/60; H04N 23/672; H04N 23/81; H04N 23/84; H04N 25/134; H04N 9/12
See application file for complete search history.

(56) References Cited

U.S. PATENT DOCUMENTS 8,797,438 B2 * 8/2014 Kera .................... H04N 25/134
                                                          348/305
9,445,068 B2 * 9/2016 Myoga .................. H04N 25/62
(Continued)

FOREIGN PATENT DOCUMENTS

| JP | 2009188982 A | 8/2009 |
|---|---|---|
| JP | 2015070432 A | 4/2015 |
| WO | WO 2019102887 A1 | 5/2019 |

OTHER PUBLICATIONS

Japanese Patent Application No. 2022-529399, Office Action dated Jun. 26, 2024, 8 pages.
(Continued)

*Primary Examiner* — Nhan T Tran
(74) *Attorney, Agent, or Firm* — Cozen O'Connor

(57) ABSTRACT

A photographing device includes: a processor; and a memory storing machine-readable instructions that, when executed by the processor, cause the processor to: acquire first partial binning data based on a first pixel group, in which the first pixel group is formed by binning at least one pixel in a unit pixel group composed of a plurality of grouped pixels; analyze a frequency characteristic of an image signal of a region composed of the unit pixel group based on a cross-correlation between the first partial binning data and second partial binning data based on a second pixel group composed of pixels other than the first pixel group in the unit pixel group; and remove Moire fringes in the region composed of the unit pixel group based on an analysis result.

16 Claims, 13 Drawing Sheets

(56) References Cited

U.S. PATENT DOCUMENTS

2016/0212364 A1* 7/2016 Okazawa ............. H04N 23/673
2020/0358989 A1* 11/2020 Hoshino ............. H04N 25/134

OTHER PUBLICATIONS

Japanese Patent Application No. 2022-529399, English translation of Office Action dated Jun. 26, 2024, 7 pages.

* cited by examiner

PHOTOGRAPHING DEVICE AND CONTROL METHOD THEREOF

CROSS-REFERENCE TO RELATED APPLICATION

The present application is a U.S. National Stage of International Application No. PCT/CN2022/089097, filed on Apr. 25, 2022, the entire contents of which are incorporated herein by reference in their entireties for all purposes.

BACKGROUND

In general, in a photographing device such as a camera, performance improvement such as high image quality and high functionality has been sought, and image sensors such as CMOS mounted in this photographing device have been designed in various ways.

SUMMARY

The present disclosure relates to a photographing device and a control method thereof.

A photographing device according to an aspect of the present disclosure includes: a processor; and a memory storing machine-readable instructions that, when executed by the processor, cause the processor to: acquire first partial binning data based on a first pixel group, in which the first pixel group is formed by binning at least one pixel in a unit pixel group composed of a plurality of grouped pixels; analyze a frequency characteristic of an image signal of a region composed of the unit pixel group based on a cross-correlation between the first partial binning data and second partial binning data based on a second pixel group composed of pixels other than the first pixel group in the unit pixel group; and remove Moire fringes in the region composed of the unit pixel group based on an analysis result.

A photographing device according to another aspect of the present disclosure, includes: a processor; and a memory storing machine-readable instructions that, when executed by the processor, cause the processor to: acquire first partial binning data based on a first pixel group, in which the first pixel group is formed by binning at least one pixel in a unit pixel group composed of a plurality of grouped pixels; analyze a frequency characteristic of an image signal of a region composed of the unit pixel group based on a cross-correlation between the first partial binning data and second partial binning data based on a second pixel group composed of pixels other than the first pixel group in the unit pixel group; and recover high-frequency components in the region composed of the unit pixel group based on an analysis result and to generate an image.

A control method according to an aspect of the present disclosure is executed by a processor included in a photographing device, and includes: a data acquisition step, in which first partial binning data based on a first pixel group is acquired, and the first pixel group is formed by binning at least one pixel in a unit pixel group composed of a plurality of grouped pixels; an analysis step, in which a frequency characteristic of an image signal of a region composed of the unit pixel group is analyzed based on a cross-correlation between the first partial binning data and second partial binning data based on a second pixel group composed of pixels other than the first pixel group in the unit pixel group; and a Moire fringe removal step, in which Moire fringes in the region composed of the unit pixel group are removed based on an analysis result.

DETAILED DESCRIPTION

Figure 1:
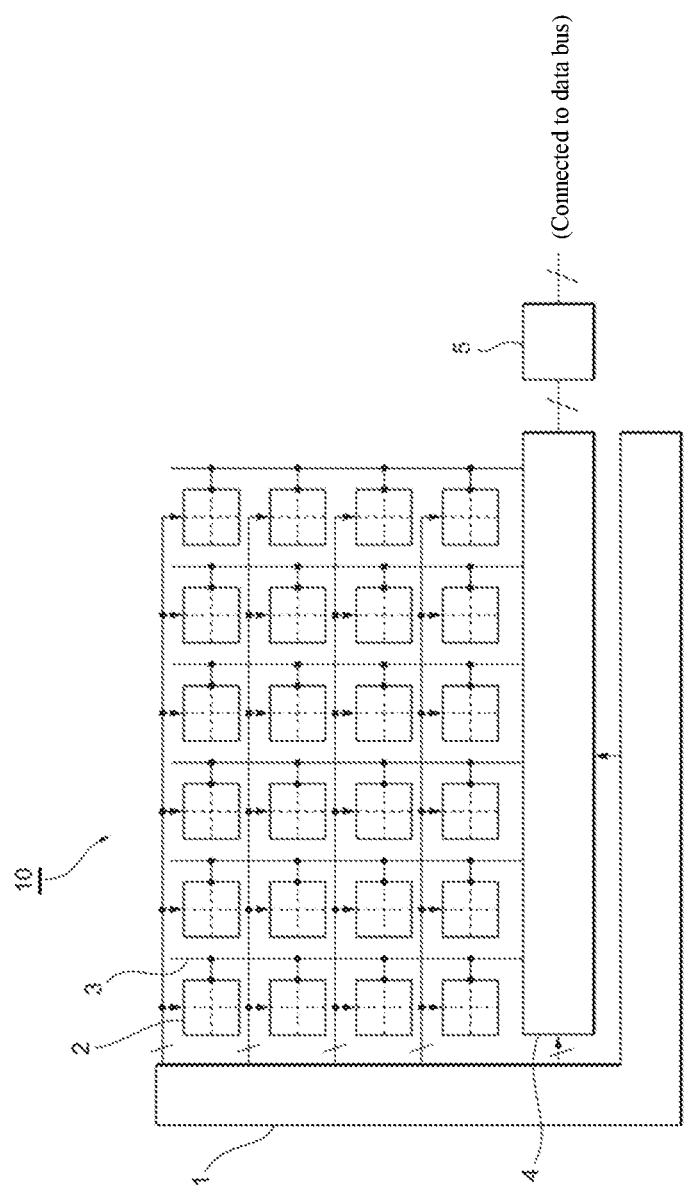
FIG. 1 is a schematic diagram illustrating a configuration of an image sensor 10 according to a first embodiment of the present disclosure.

Hereinafter, embodiments of the present disclosure will be described in detail with reference to the accompanying drawings. In addition, the embodiments described below are only specific examples for implementing the present disclosure, and are not intended to explain the present disclosure in a limited manner. In addition, in order to facilitate the understanding and explanation, the same components are labeled with the same reference signs as much as possible in the drawings, and repeated explanations are omitted sometimes.

First Embodiment

[Regarding Image Sensor]

FIG. 1 is a schematic diagram illustrating a configuration of an image sensor 10 according to a first embodiment of the present disclosure. As shown in FIG. 1, the image sensor 10 is typically a CMOS image sensor, and includes a control circuit 1, a plurality of pixel groups 2 arranged in two dimensions, a signal line 3, a reading circuit 4, and a digital signal processing unit (DSP) 5.

In addition, here, the pixel group 2 is made into one pixel group (unit pixel group) by grouping 4 (2×2) pixels, however the present disclosure is not limited to this. For example, 3 (3×1) pixels, 8 (4×2) pixels, 9 (3×3) pixels, and 16 (4×4) pixels may also serve as one unit pixel group.

The control circuit 1 drives a plurality of pixel groups 2 of the image sensor 10, controls reading of data based on optical signals accumulated in the plurality of pixel groups 2, and outputs the data to the outside of the image sensor 10.

The plurality of pixel groups 2 are arranged in two dimensions, the optical signal which is brought to the image sensor 10 is accumulated based on a control signal from the control circuit 1 and a control signal generated by the pixel group 2 itself, and the data (electric signal) based on the optical signal is read.

The electrical signals read from the plurality of pixel groups 2 are transmitted to the reading circuit 4 via the signal line 3 (typically, a column signal line parallel to a column direction), and the electrical signals are analog-to-digital converted.

The digital signal processing unit (DSP) 5 processes a digital signal after being analog-to-digital converted by the reading circuit 4. Then, the processed digital signal is transmitted to a processor or memory of a photographing device via a data bus.

In addition, the DSP5 is not limited to this configuration. For example, the configuration may be as follows. The image sensor 10 does not include the DSP5, and the subsequent processor has the DSP. Further, it is also possible to provide a configuration in which part of digital signal processing in image processing is handled by the DSP5 of the image sensor 10 and the DSP included in the subsequent processor or the like. In other words, the position of the DSP in the present disclosure is not limited to a specified position.

[Regarding Binning]

Figure 2:
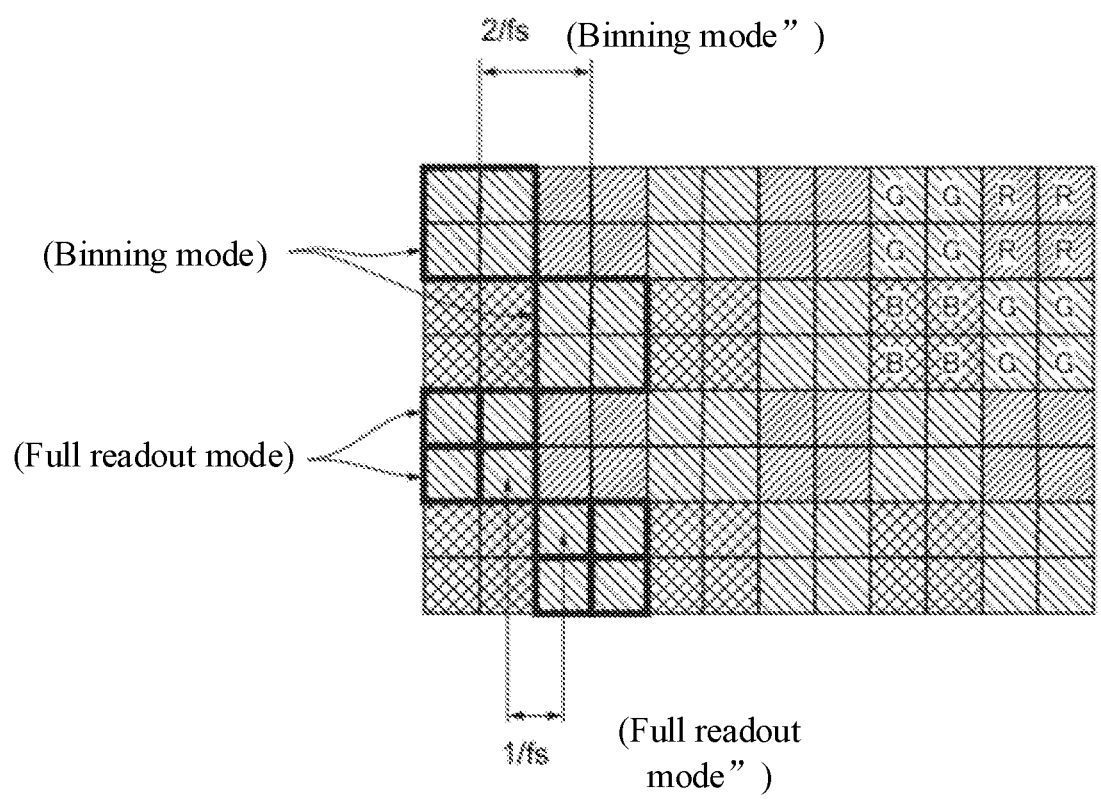
FIG. 2 is a diagram illustrating binning used in the image sensor 10 according to the first embodiment of the present disclosure.

FIG. 2 is a diagram illustrating binning used in the image sensor 10 of the first embodiment of the present disclosure. In FIG. 2, as an example, in a color pixel configuration of a single-board Bayer arrangement, each color is composed of 4 (2×2) pixels.

When each pixel serves as an independent pixel and the data from each pixel is read in, a high-resolution image based on a high sampling frequency may be acquired. On the other hand, as shown in FIG. 2, four pixels are made into one pixel group (unit pixel group) by binning and data from the four pixels are read in, so that a high SNR based on a high signal electron number, a high sensitivity based on a wide pixel size, a high frame rate based on a few pixels, and a low power consumption based on a low reading may be realized.

In other words, according to the binning, the resolution and other properties are in a compromise relationship. Specifically, when each pixel serves as an independent pixel and the data from all pixels are read, a sampling frequency at the time of the above reading is set to be fs (full readout mode). In comparison, when four pixels are made into one pixel group (unit pixel group) by binning and the data from the four pixels are read, a sampling frequency at the time of the above reading is reduced to fs/2 (binning mode).

Figure 3:
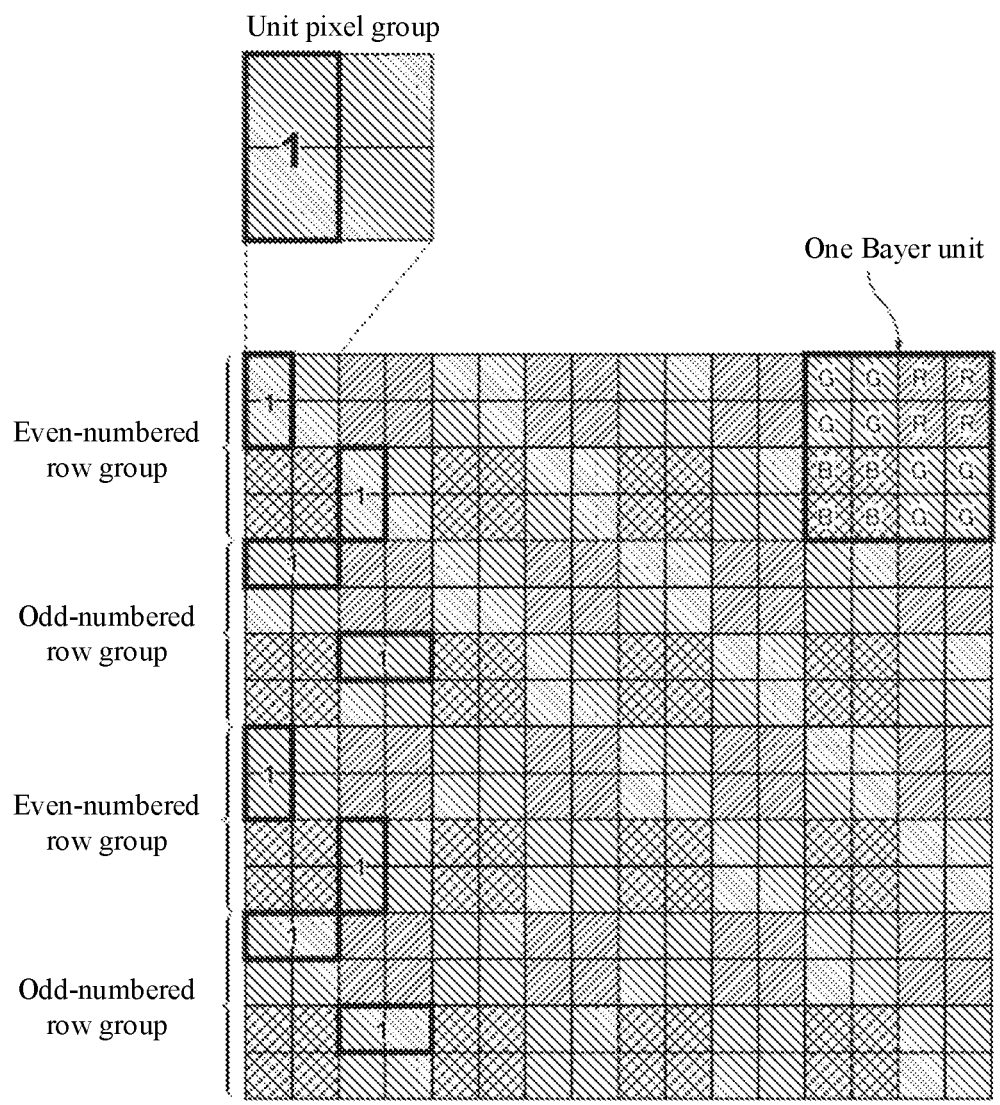
FIG. 3 is a diagram illustrating partial binning used in the image sensor 10 according to the first embodiment of the present disclosure.

FIG. 3 is a diagram illustrating partial binning used in the image sensor 10 of the first embodiment of the present disclosure. In FIG. 3, as an example, a Bayer arrangement composed of green (G), red (R), blue (B) and green (G) serves as one Bayer unit, and the Bayer units are arranged in a matrix.

In addition, here, one Bayer unit is composed of 4 (2×2) unit pixel groups of G, R, B and G, however the present disclosure is not limited to this. For example, one Bayer unit may also be composed of 9 (3×3) unit pixel groups and 16 (4×4) unit pixel groups.

In an even-numbered row group, as shown by the numeral "1", for example, in a unit pixel group of 4 (2×2) pixels composed of G, two pixels in a left half (first pixel group) are partially binned, and data (first partial binning data) is read. Next, all the 4 (2×2) pixels composed of the above G are binned, and data (full binning data) is read.

In an odd-numbered row group, as shown by the numeral "1", for example, in a unit pixel group of 4 (2×2) pixels composed of G, two pixels in an upper half (first pixel group) are partially binned, and data (first partial binning data) is read. Next, all the 4 (2×2) pixels composed of the above G are binned, and data (full binning data) is read.

In addition, in the unit pixel group of 4 (2×2) pixels composed of G, data of a right half and data of a lower half (second pixel group, second partial binning data) may be generated based on a difference between the full binning data read in the full binning and the partial binning data read in the partial binning.

In addition, here, a part of the unit pixel group of 4 (2×2) pixels composed of G is taken as an example for specific explanation, but the same processing is also performed for other unit pixel groups of 4 (2×2) pixels composed of G, unit pixel groups of 4 (2×2) pixels composed of R, and unit pixel groups of 4 (2×2) pixels composed of B.

[Regarding Moire Fringe Removal]

Next, a process of removing Moire fringes (aliasing) by using the partial binning data and the full binning data output from the image sensor 10 will be described. In addition, the Moire fringe is a kind of noise generated in the image, but the Moire fringe removal in this specification also includes the removal of the same kind of aliasing, which naturally may also be processed.

Figure 4:
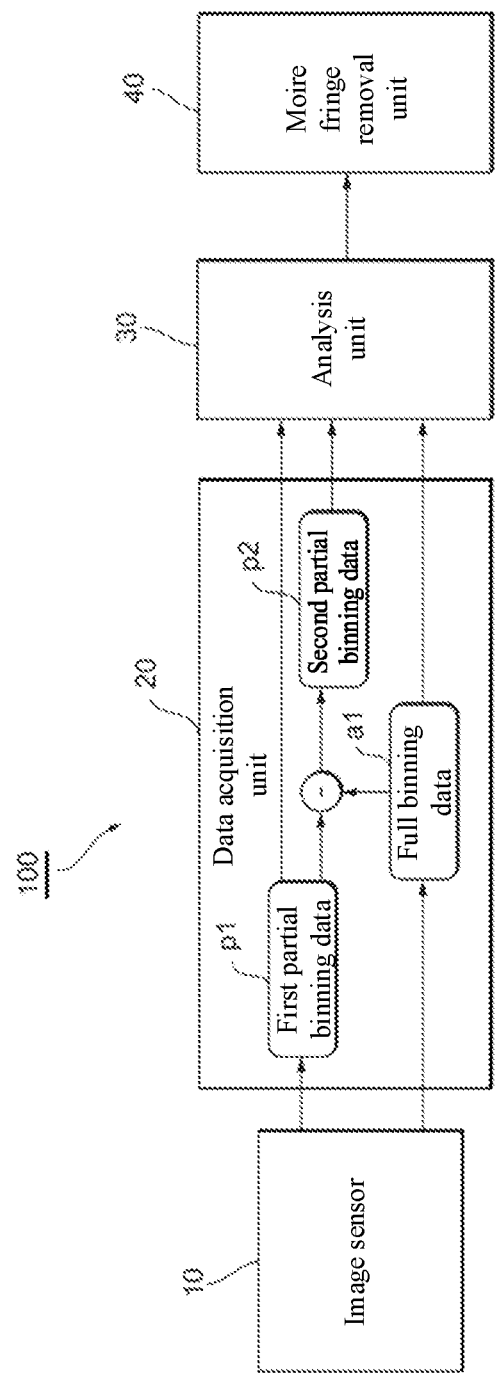
FIG. 4 is a block diagram illustrating each function and data flow of a photographing device 100 according to the first embodiment of the present disclosure.

FIG. 4 is a block diagram illustrating each function and data flow of a photographing device 100 of the first embodiment of the present disclosure. As shown in FIG. 4, the photographing device 100 includes an image sensor 10, a data acquisition unit 20, an analysis unit 30, and a Moire fringe removal unit 40. In addition, although the optical system, the memory, etc. are not shown here, and the detailed description thereof is also omitted, the functions or components possessed by a general photographing device are also possessed by the photographing device 100. In addition, the photographing device of the present disclosure is suitable for digital cameras and terminals such as smart phones, tablets, notebook computers and the like equipped with photographing functions.

The image sensor 10 is the image sensor described with reference to the above FIGS. 1 to 3. As shown in FIG. 4, first partial binning data p1 and full binning data al are read from the image sensor 10.

Here, the full binning data al, the first partial binning data p1 and second partial binning data p2 may be read and generated, for example, by the process described above with reference to FIG. 3.

Specifically, the first partial binning data p1 is data based on a first pixel group formed by binning at least one pixel in the unit pixel group composed of the plurality of grouped pixels. In FIG. 3, the first partial binning data p1 is equivalent to data read from two pixels indicated by the numeral "1" in the unit pixel group.

The full binning data al is data based on all pixels in the unit pixel group composed of the plurality of grouped pixels.

In FIG. 3, the full binning data al is equivalent to data read from the 4 (2×2) pixels in the unit pixel group.

Then, the first partial binning data p1 is subtracted from the full binning data al, so that the second partial binning data p2 is generated based on the difference therebetween.

Based on the cross-correlation between the first partial binning data p1 and the second partial binning data p2, the analysis unit 30 analyzes a frequency characteristic of the image signal of the region composed of this unit pixel group.

For example, the analysis unit 30 calculates the cross-correlation between the first partial binning data p1 and the second partial binning data p2, and determines that the region composed of this unit pixel group contains many high-frequency components when the cross-correlation is small (below a predetermined threshold).

Moreover, the possibility that the Moire fringes are generated periodically is very high, and considering its characteristic, the analysis unit 30 may estimate in the image sensor 10 which unit pixel group composes the region where the Moire fringes are generated.

For example, in the example shown in FIG. 3, in the even-numbered row group, the analysis unit 30 calculates the cross-correlation between the first partial binning data based on the two pixels in the left half of the unit pixel group and the second partial binning data based on the two pixels in the right half of the unit pixel group. In addition, in the odd-numbered row group, the analysis unit 30 calculates the cross-correlation between the first partial binning data based on the two pixels in the upper half of the unit pixel group and the second partial binning data based on the two pixels in the lower half of the unit pixel group. That is, although the analysis unit 30 analyzes the frequency characteristic of the image signal in longitudinal and transverse directions in the unit pixel group, it sets binning groups for each row alternately in the longitudinal and transverse directions. Therefore, according to the generation situation of the Moire fringes, and also considering that it is impossible to determine all the regions (unit pixel groups) where the Moire fringes are generated, but as described above, it is possible to estimate which region (unit pixel group) generates the Moire fringes by assuming that the Moire fringes are generated periodically (with specified length and period) in a fringe pattern.

In addition, the threshold for calculating the cross-correlation between the first partial binning data p1 and the second partial binning data p2 and determining that many high-frequency components are contained may be changed or set in advance according to, for example, the type and performance of the photographing device including a lens or the image sensor, an object to be photographed or a surrounding environment, and other photographing situations. In addition, an appropriate threshold may also be set by using AI (Artificial Intelligence) learning. Moreover, for example, the first partial binning data p1, the second partial binning data p2, and the full binning data al, etc. may also serve as supervision data, and AI may be used to determine whether the Moire fringes are generated.

In this way, the analysis method of the analysis unit 30 is not particularly limited, and various analysis methods may be used to analyze the frequency characteristic of the image signal of the region composed of the unit pixel group, and to detect the region containing many high-frequency components, the region where the Moire fringes are generated, and the like.

The Moire fringe removal unit 40 removes the Moire fringes in the region composed of the unit pixel group based on the analysis result of the analysis unit 30.

For example, the Moire fringe removal unit 40 may remove the high-frequency components of the image signal (for example, the full binning data al of this unit pixel group) in the region containing many high-frequency components through a low-pass filter.

In addition, the Moire fringe removal unit 40 may also remove the Moire fringes based on the image signal (for example, the full binning data al of another unit pixel group) in the region where the Moire fringes are not generated near the region where the Moire fringes are generated. Here, the region where the Moire fringes are not generated near the region where the Moire fringes are generated, refers to the region where the Moire fringes are not generated, which is located adjacent to (up, down, left and right, and inclined positions on the extension line of the diagonal line) and surrounds the region where the Moire fringes are generated. That is, the Moire fringe removal unit 40 performs interpolation on the region where the Moire fringes are generated according to the image signal of another region, thus generating an image without Moire fringes.

In addition, not limited to the generation of the Moire fringes, an image generation unit (not shown) for appropriately recovering the high-frequency components may be provided instead of the Moire fringe removal unit 40 or additionally, for the region (unit pixel group) which is determined by the analysis unit 30 to contain the high-frequency components that need to be processed. Typically, the image generation unit may perform interpolation on the region (unit pixel group) which is determined to need image processing according to the image signal of the region adjacent thereto, so as to recover the high-frequency components appropriately, and AI may also be used to recover the high-frequency components appropriately.

In addition, in the example shown in FIG. 4, the data acquisition unit 20 acquires the second partial binning data p2 by subtracting the first partial binning data p1 from the full binning data al, and the analysis unit 30 calculates the cross-correlation between the first partial binning data and the second partial binning data p2, however the present disclosure is not limited to this. For example, the analysis unit 30 may also analyze the frequency characteristic of the image signal of the region composed of the unit pixel group based on the first partial binning data p1 and the full binning data al and based on the cross-correlation between the first partial binning data p1 and the second partial binning data p2.

The data acquisition unit 20 reads the first partial binning data p1 and the full binning data al from the image sensor 10, however the present disclosure is not limited to this. For example, the first partial binning data p1 and the second partial binning data p2 may also be read. In this case, the analysis unit 30 may analyze the frequency characteristic of the image signal of the region composed of the unit pixel group based on the cross-correlation between the first partial binning data p1 and the second partial binning data p2 read from the image sensor 10.

In addition, based on the analysis result of the analysis unit 30, for the region containing many high-frequency components, the Moire fringe removal unit 40 and/or the image generation unit typically generates an appropriate image based on the full binning data al, including the removal of the Moire fringes, but may also generate an image based on the first partial binning data p1 and the second partial binning data p2.

Moreover, the Moire fringe removal unit 40 and/or the image generation unit may generate an appropriate image after demosaicing the full binning data a1 or the first partial binning data p1 and the second partial binning data p2.

[Regarding Circuit Configuration of Each Pixel in Image Sensor]

As the image sensor, the specific method of the binning of the unit pixel group is described. Here, the specific configuration and operation of the unit pixel group in the image sensor will be further described in detail.

Figure 5:
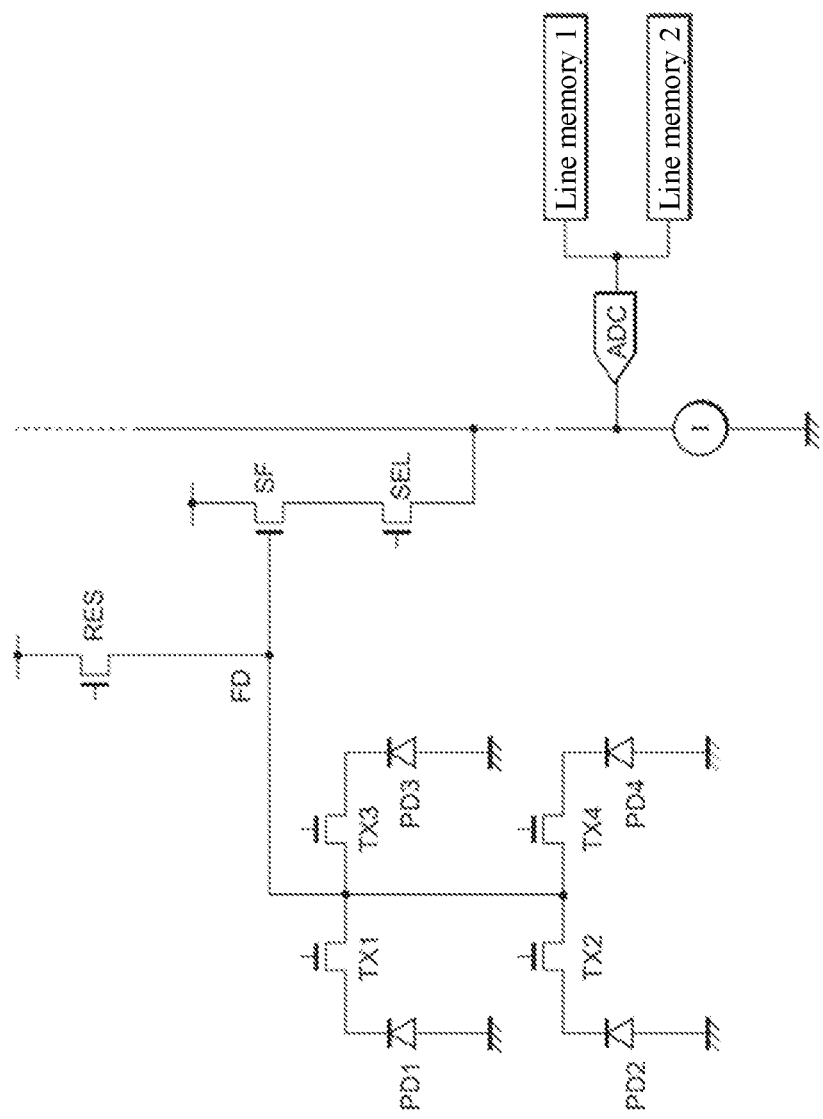
FIG. 5 is a diagram schematically illustrating a circuit configuration of a signal flow of an example of binning of 4 (2×2) pixels.

FIG. 5 is a diagram schematically illustrating a circuit configuration of a signal flow of an example of binning of 4 (2×2) pixels. As shown in FIG. 5, the 4 (2×2) pixels correspond to four photodiodes (PD1-PD4), and are composed of a floating diffusion region (FD), a source follower amplifier (SF), a reset transistor (RES), transmission transistors (TX1-TX4) and a selection transistor (SEL) connected thereto.

The four photodiodes (PD1-PD4) are connected to the common floating diffusion region (FD). The output of the source follower amplifier (SF) is connected to a common output line (equivalent to the signal line 3 in FIG. 1) via the selection transistor (SEL) in a column in which a plurality of pixel groups are arranged in two dimensions, and is connected to a constant current source (I) as a load of the source follower amplifier (SF), a voltage gain conversion unit (not shown), and an analog-to-digital converter (ADC).

Further, the digital signal (data) converted by the analog-to-digital converter (ADC) is held in a line memory 1 or a line memory 2.

Figure 6:
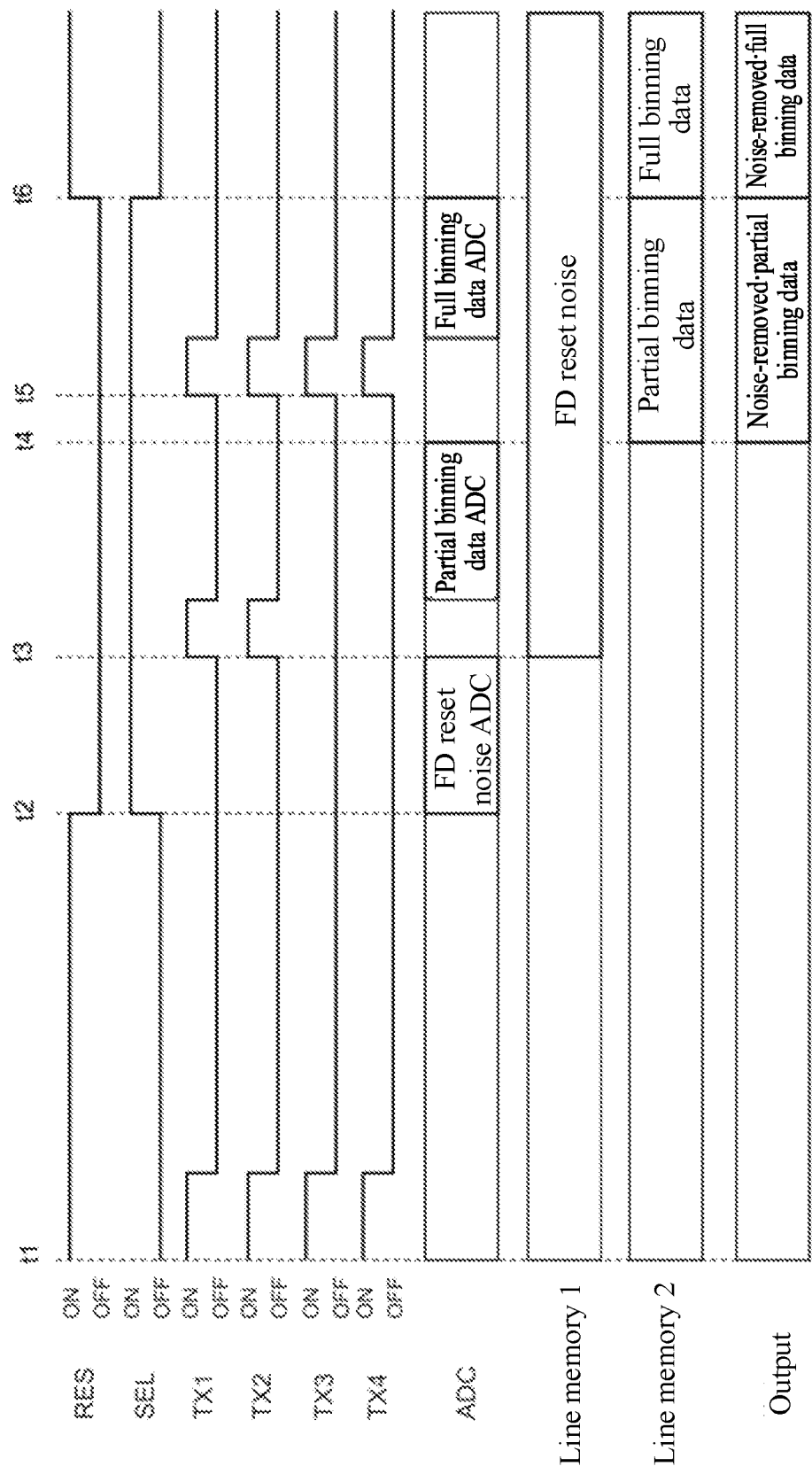
FIG. 6 is a diagram illustrating an operation of each element of the circuit configuration of 4 (2×2) pixels shown in FIG. 5.

FIG. 6 is a diagram illustrating an operation of each element of circuit configuration of 4 (2×2) pixels shown in FIG. 5.

At time t1, the reset transistor (RES) and the transmission transistors (TX1-TX4) are turned on, and the photodiodes (PD1-PD4) are reset.

Then, after a specified accumulation period for accumulating data, the processing of reading data from the pixel composing the unit pixel group is started. First, at time t2, the reset transistor (RES) is turned off and the selection transistor (SEL) is turned on. Next, a value thereof is analog-to-digital converted with a specified voltage gain and is held in the line memory 1 (FD reset noise).

At time t3, in order for partial binning, among the transmission transistors (TX1-TX4), for example, the transmission transistors (TX1-TX2) are turned on, so that the signals from the photodiodes (PD1-PD2) are transmitted to the floating diffusion region (FD). Next, a value thereof is analog-to-digital converted with a specified voltage gain and is held in the line memory 2 (partial binning data).

At time t4, the value held in the line memory 1 is subtracted from the value held in the line memory 2, and the result thereof is output and transmitted to a subsequent image signal processor (ISP) or frame memory. Thus, data (noise-removed/partial binning data), which is called correlated double sampling and from which the reset noise of the floating diffusion region (FD) has been removed, may be acquired. This data is equivalent to the first partial binning data p1 in FIG. 4.

At time t5, in order for full binning, the signals from the photodiodes (PD1-PD4) are transmitted to the floating diffusion region (FD) by turning on the transmission transistors (TX1-TX4). Next, a value thereof is analog-to-digital converted with a specified voltage gain and is held in the line memory 2 (full binning data).

In addition, here, it is assumed that the output of the partial binning data held in the line memory 2 is completed before the analog-to-digital conversion of the full binning data is finished, but when the output of the partial binning data is not completed, an additional line memory for holding the full binning data may be provided.

In addition, since the reset noise of the fully binned floating diffusion region (FD) may use the data held in the line memory 1, the value held in the line memory 1 is subtracted from the value held in the line memory 2, and the result thereof is output at time t6. Thus, the full binning data (noise-removed·full binning data) from which the reset noise of the floating diffusion region (FD) has been removed may be acquired. This data is equivalent to the full binning data a1 in FIG. 4.

In this way, the first partial binning data p1 and the full binning data a1 are taken out from each unit pixel group of the image sensor 10.

[Regarding Control Method]

Next, the control method of removing the Moire fringes and also generating the image by using the binning data is described in detail.

Figure 7:
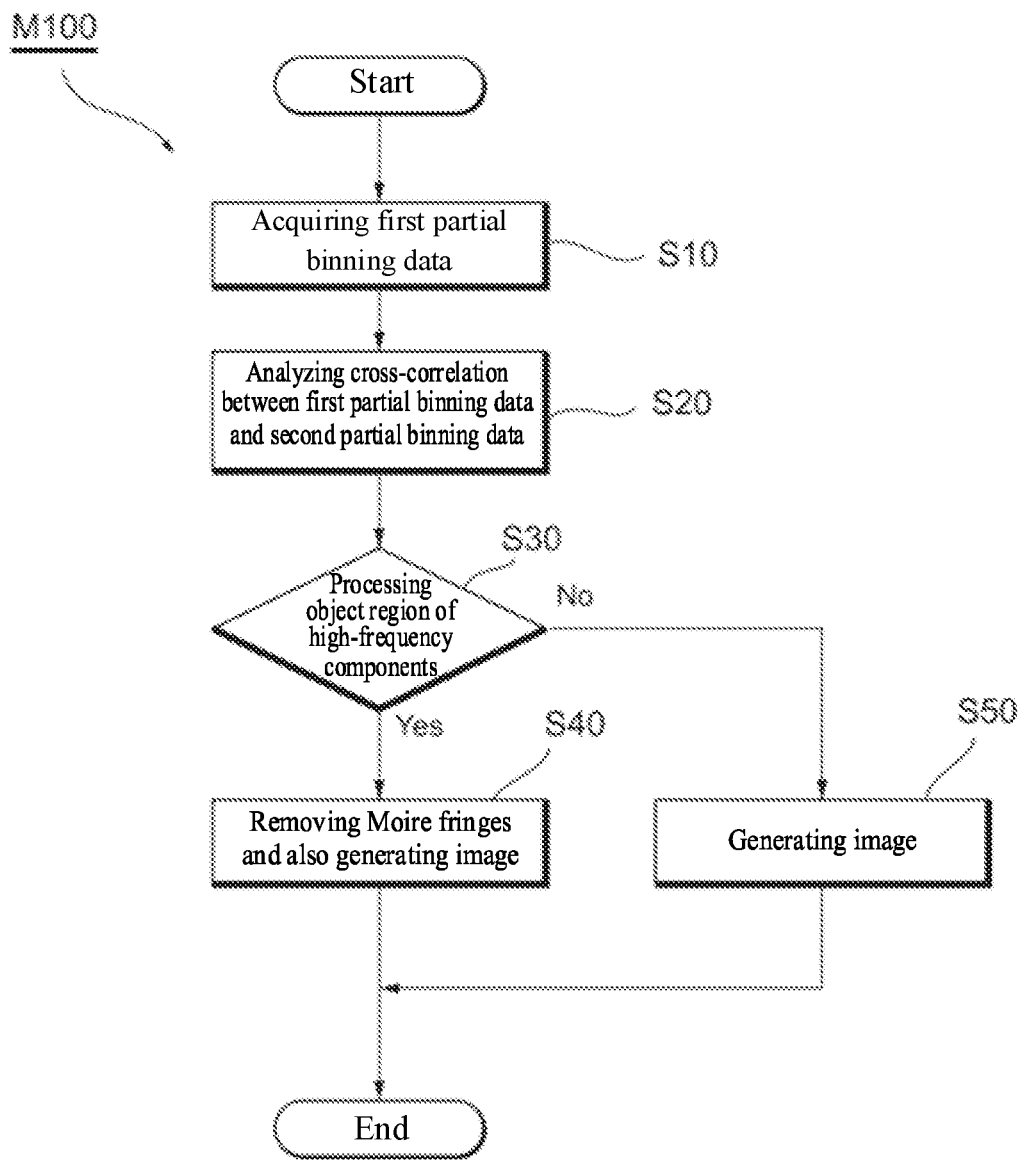
FIG. 7 is a flow chart illustrating a flow of processing of a control method M100 executed by the photographing device 100 according to the first embodiment of the present disclosure.

FIG. 7 is a flow chart illustrating a flow of processing of a control method M100 executed by the photographing device 100 of the first embodiment of the present disclosure. As shown in FIG. 7, the control method M100 includes steps S10 to S50, and each step is executed by a processor included in the photographing device 100.

At step S10, the data acquisition unit 20 acquires the first partial binning data based on the first pixel group in the unit pixel group (data acquisition step). As a specific example, as shown in FIGS. 3 and 4, the data acquisition unit 20 partially bins two pixels indicated by the numeral "1" in the unit pixel group of 4 (2×2) pixels, and reads data (first partial binning data p1) from the image sensor 10.

At step S20, the analysis unit 30 analyzes the frequency characteristic of the image signal of the region composed of this unit pixel group based on the cross-correlation between the first partial binning data acquired at step S10 and the second partial binning data based on the second pixel group composed of pixels other than the first pixel group in the unit pixel group (analysis step). As a specific example, as shown in FIGS. 3 and 4, the data acquisition unit 20 fully bins all the pixels of the unit pixel group of 4 (2×2) pixels and reads data (full binning data a1) from the image sensor 10, and subtracts the first partial binning data p1 from the full binning data a1 to acquire the second partial binning data p2. Next, the analysis unit 30 calculates the cross-correlation between the first partial binning data p1 and the second partial binning data p2, and analyzes the frequency characteristic of the image signal of the region composed of this unit pixel group.

At step S30, the analysis unit 30 determines whether the region composed of the unit pixel groups is a processing object region which contains many high-frequency components that need to be processed. As a specific example, based on the cross-correlation between the first partial binning data p1 and the second partial binning data p2 calculated at step S20, the analysis unit 30 determines whether the region composed of this unit pixel group is the processing object region of the high-frequency components. When the cross-correlation is small, the region is determined as the processing object region of the high-frequency components because it contains many high-frequency components (Yes at step S30), and when the cross-correlation is large, it is determined that the region is not the processing object region of the high-frequency components (No at step S30).

At step S40 (Yes at step S30), the Moire fringe removal unit 40 removes the Moire fringes in the region composed of the unit pixel group and also generates the image (Moire fringe removal step). As a specific example, for the region composed of the unit pixel group, the Moire fringe removal unit 40 removes the high-frequency components by using the low-pass filter or performs interpolation according to the image signal of another region, thus removing the Moire fringes and also generating the image.

At step S50 (No at step S30), the image generation unit generates an appropriate image for the region composed of the unit pixel group based on the full binning data al.

As described above, according to the photographing device 100 and the control method M100 of the first embodiment of the present disclosure, the data acquisition unit 20 acquires the first partial binning data p1 based on the first pixel group in the unit pixel group, the analysis unit 30 analyzes the frequency characteristic of the image signal of the region composed of the unit pixel group based on the cross-correlation between the first partial binning data p1 and the second partial binning data p2, and the Moire fringe removal unit 40 removes the Moire fringes in the region composed of the unit pixel group based on the analysis result. As a result, the image may be generated while removing the Moire fringes appropriately.

[Another Specific Example of Grouping (Partial Binning) of Unit Pixel Group]

In this embodiment, as shown in FIG. 3, the 4 (2×2) pixels are grouped into the unit pixel group, the two pixels in the left half or the two pixels in the upper half are partially binned, and the data is read as the first partial binning data. However, the partial binning is not limited to this. Another specific example of partial binning will be described as follows.

Another Specific Example 1

Figure 8:
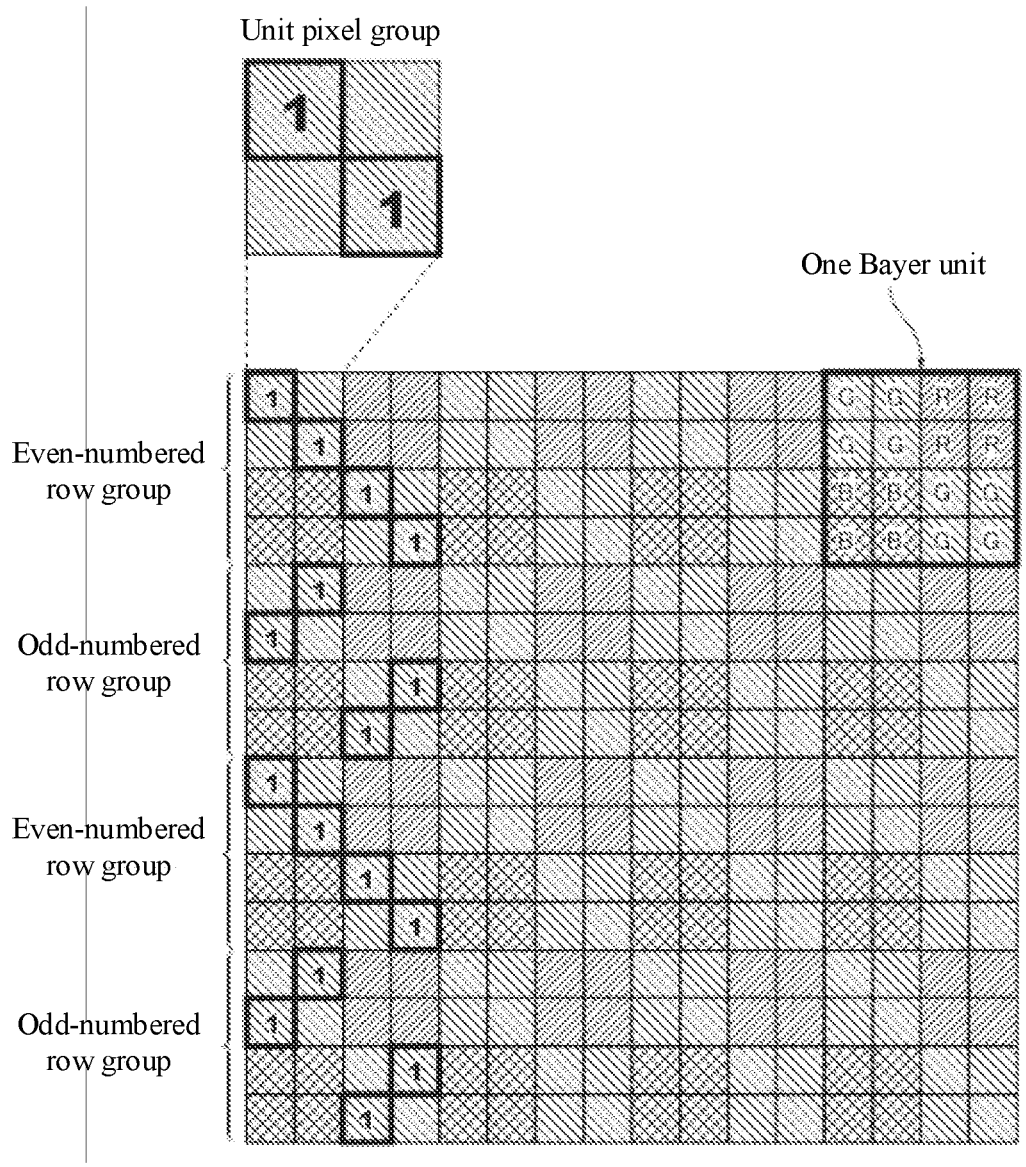
FIG. 8 is a diagram illustrating another partial binning (another specific example 1) used in the image sensor 10 according to the first embodiment of the present disclosure.

FIG. 8 is a diagram illustrating another partial binning (another specific example 1) used in the image sensor 10 of the first embodiment of the present disclosure. As shown in FIG. 8, Bayer units composed of green (G), red (R), blue (B) and green (G) are arranged in a matrix as in FIG. 3.

In the even-numbered row group, as shown by the numeral "1", in the unit pixel group, upper left and lower right two pixels (first pixel group) are partially binned, and data (first partial binning data) is read.

In the odd-numbered row group, as shown by the numeral "1", in the unit pixel group, upper right and lower left two pixels (first pixel group) are partially binned, and data (first partial binning data) is read.

Thus, in the unit pixel group, the pixels arranged in the diagonal line are partially binned. Other processes are the same as those described with reference to FIG. 3.

Another Specific Example 2

Figure 9:
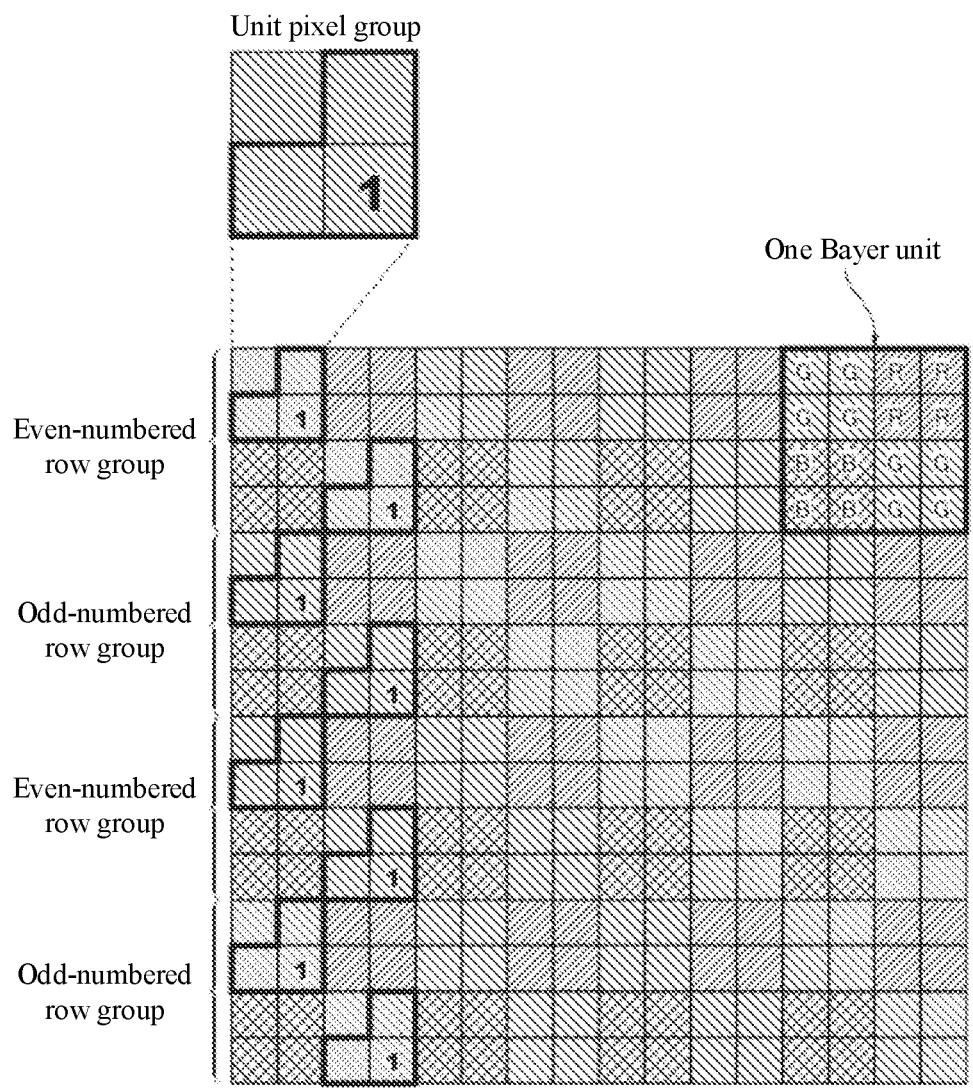
FIG. 9 is a diagram illustrating another partial binning (another specific example 2) used in the image sensor 10 according to the first embodiment of the present disclosure.

FIG. 9 is a diagram illustrating another partial binning (another specific example 2) used in the image sensor 10 of the first embodiment of the present disclosure. As shown in FIG. 9, Bayer units composed of green (G), red (R), blue (B) and green (G) are arranged in a matrix as in FIG. 3.

In the even-numbered row group and the odd-numbered row group, as shown by the numeral "1", in the unit pixel group, upper right, lower right and lower left three pixels (first pixel group) are partially binned, and data (first partial binning data) is read.

Thus, in the unit pixel group (4 pixels), three pixels are partially binned. Other processes are the same as those described with reference to FIG. 3.

In the example of FIG. 9, in the unit pixel group, a plurality of pixels are grouped in an asymmetric manner and are partially binned. Therefore, based on the cross-correlation between the first partial binning data (the first pixel group indicated by the numeral "1") and the second partial binning data (the second pixel group except the first pixel group in the unit pixel group), the analysis unit 30 may analyze the frequency of the image signal in the longitudinal and transverse directions in this unit pixel group more appropriately. That is, the analysis unit 30 may analyze more appropriately that the region composed of this unit pixel group contains many high-frequency components and generates the Moire fringes.

Another Specific Example 3

Figure 10:
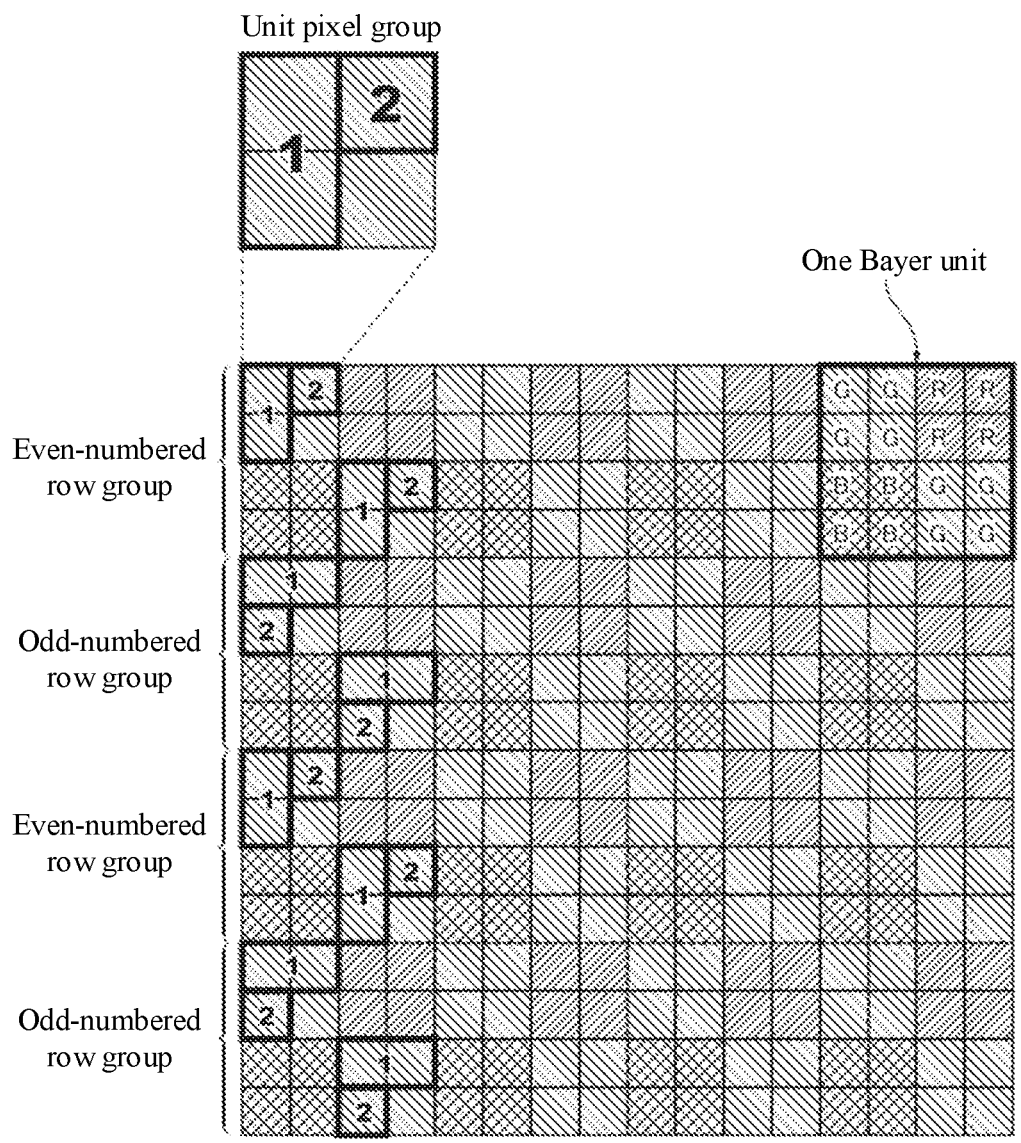
FIG. 10 is a diagram illustrating another partial binning (another specific example 3) used in the image sensor 10 according to the first embodiment of the present disclosure.

FIG. 10 is a diagram illustrating another partial binning (another specific example 3) used in the image sensor 10 of the first embodiment of the present disclosure. As shown in FIG. 10, Bayer units composed of green (G), red (R), blue (B) and green (G) are arranged in a matrix as in FIG. 3.

In the even-numbered row group, as shown by the numeral "1", in the unit pixel group, two pixels in the left half (first pixel group) are partially binned, and data (first partial binning data) is read, and the upper right pixel is added to the first pixel group, or is partially binned separately, and data (additional partial binning data) is read.

In the odd-numbered row group, as shown by the numeral "1", in the unit pixel group, two pixels in the upper half (first pixel group) are partially binned, and data (first partial binning data) is read, and the lower left pixel is added to the first pixel group, or is partially binned separately, and data (additional partial binning data) is read.

In this way, in the unit pixel group, the first pixel group is partially binned, and then different pixel groups (first pixel group plus another pixel or another pixel alone) are partially binned. Next, the unit pixel group is fully binned, and the full binning data is read.

In the example of FIG. 10, a plurality of partial binning data in regions composed of pixel groups with different centers of gravity is acquired, so that when the above partial binning data is subtracted from the full binning data, a plurality of second partial binning data may also be acquired. Based on the first partial binning data and the second partial binning data obtained by various combinations acquired above, the analysis unit 30 may analyze more appropriately that the region composed of this unit pixel group contains many high-frequency components and generates the Moire fringes.

As illustrated herein, there are various ways in the partial binning, however the present disclosure is not limited to these. The partially binned pixels in the unit pixel group may be set regularly or randomly. For example, the analysis unit 30 may set the partially binned pixels in the unit pixel group according to the type and performance of the photographing device including the lens and the image sensor, the object to be photographed, the surrounding environment and other photographing situations, so that the unit pixel group (region) containing many high-frequency components and generating the Moire fringes may be appropriately analyzed.

In addition, as described above, one unit pixel group is not limited to 4 (2×2) pixels, for example, it may also be composed of 3 (3×1) pixels, 8 (4×2) pixels, 9 (3×3) pixels, and 16 (4×4) pixels. One Bayer unit is also not limited to 4 (2×2) unit pixel groups, for example, it may also be composed of 9 (3×3) unit pixel groups and 16 (4×4) unit pixel groups. How to set the partially binned pixels may be determined appropriately, or may be determined by AI.

Second Embodiment

Next, as an image sensor of the second embodiment of the present disclosure, a specific method of combining a dual conversion gain (DCG) and an all-pixel photographing plane phase difference AF (autofocus) for operations will be described. The basic configuration of the image sensor of this embodiment is the same as that of the image sensor 10 of the first embodiment, and the binning of pixels is also carried out in the same way as that of the first embodiment. Here, with regard to the pixels in the image sensor, the specific configuration and operation of combining the dual conversion gain and the all-pixel photographing plane phase difference AF for operations are described in detail.

Figure 11:
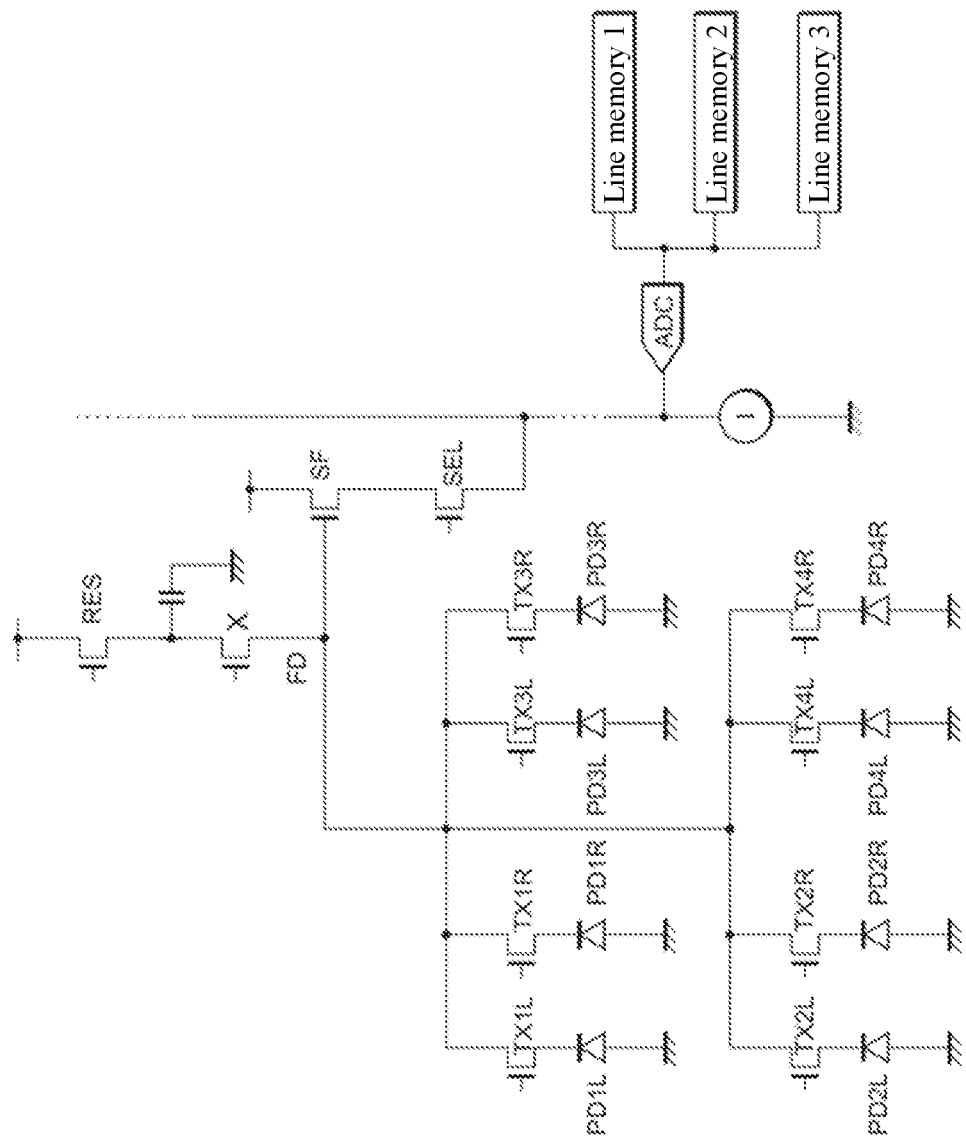
FIG. 11 is a diagram schematically illustrating a circuit configuration in regard to a signal flow which is used for explaining an example of combining a dual conversion gain and an all-pixel photographing plane phase difference AF for operations in 4 (2×2) pixels.

FIG. 11 is a diagram schematically illustrating a circuit configuration in regard to a signal flow which is used for explaining an example of combining the dual conversion gain and the all-pixel photographing plane phase difference AF for operations in 4 (2×2) pixels. As shown in FIG. 11, here, each of the four photodiodes (PD1-PD4) shown in FIG. 5 is divided into two, i.e. sub-photodiodes (PD1L/PD1R-PD4L/PD4R), and the transmission transistors (TX1-TX4) are configured into transmission transistors (TX1L/TX1R-TX4L/TX4R) corresponding to the sub-photodiodes (L: left, R: right).

Furthermore, a floating diffusion region (FD), a source follower amplifier (SF), a reset transistor (RES), a switching transistor (X) and a selection transistor (SEL) are arranged in this circuit.

Moreover, for the dual conversion gain, an additional load capacitor that may be electrically switched by the switching transistor (X) is added to the pixel. By increasing the load capacitance of the floating diffusion region (FD), the charge-voltage conversion gain may be set to be small, and by reducing the load capacitance, the charge-voltage conversion gain may be set to be large.

Figure 12:
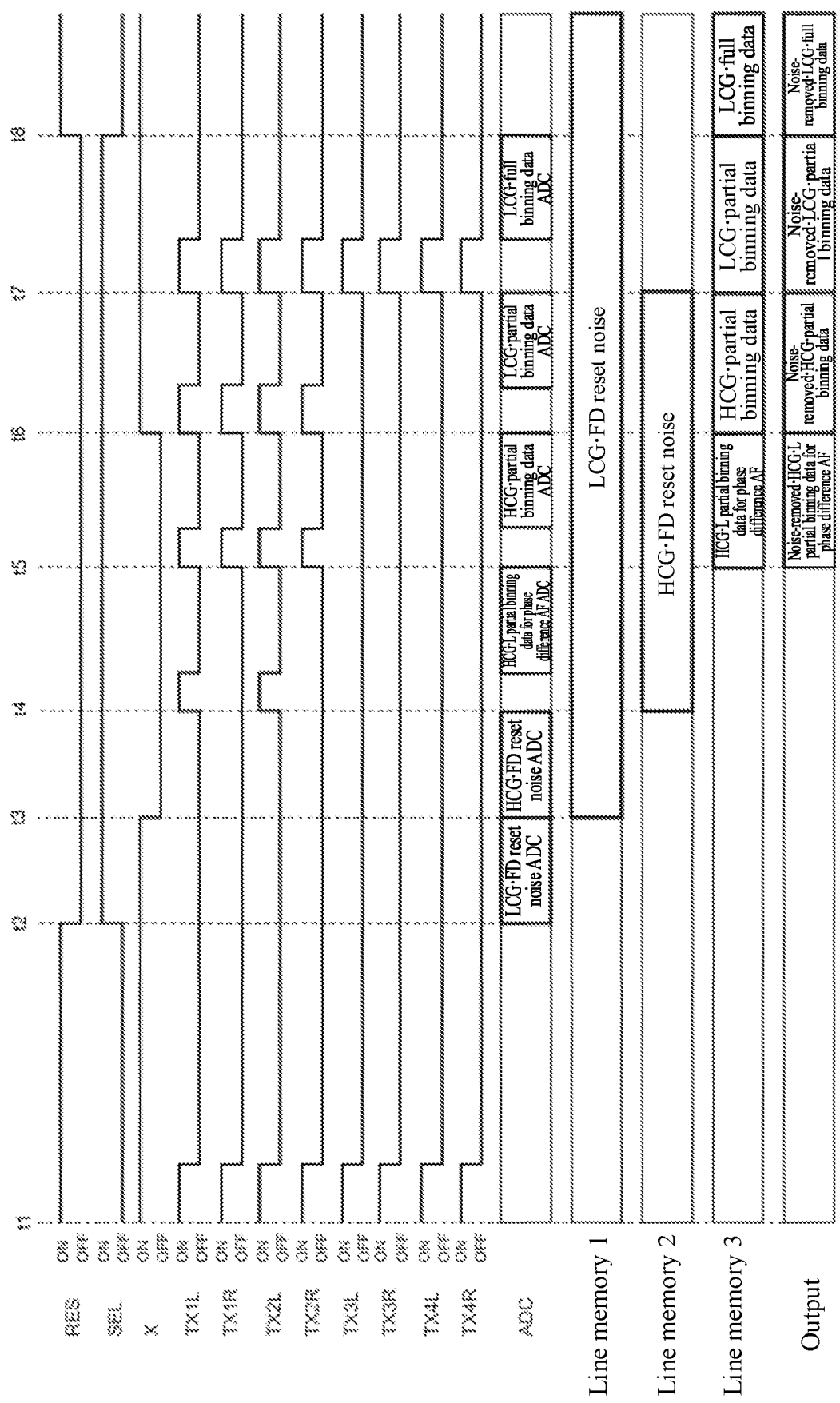
FIG. 12 is a diagram illustrating an operation of each element of the circuit configuration of 4 (2×2) pixels shown in FIG. 11.

FIG. 12 is a diagram illustrating an operation of each element of the circuit configuration of 4 (2×2) pixels shown in FIG. 11. In addition, each of the 4 (2×2) pixels is composed of two sub-pixels (L: left, R: right). Additionally, here, although each pixel is composed of two sub-pixels, the present disclosure is not limited to this, and for example, each pixel may also be composed of three or more sub-pixels.

At time t1, the reset transistor (RES), the switching transistor (X) and the transmission transistors (TX1L/TX1R-TX4L/TX4R) are turned on, and the sub-photodiodes (PD1L/PD1R-PD4L/PD4R) are reset.

Then, after a specified accumulation period for accumulating data, the processing of reading data from the pixel composing the unit pixel group is started. First, at time t2, the reset transistor (RES) is turned off, and the switching transistor (X) and the selection transistor (SEL) are turned on. Next, in a state (LCG) where the charge-voltage conversion gain of the floating diffusion region (FD) decreases, the FD reset noise is analog-to-digital converted and stored in the line memory 1 (LCG/FD reset noise).

At time t3, the switching transistor (X) is turned off, and in a state (HCG) where the charge-voltage conversion gain of the floating diffusion region (FD) increases, the FD reset noise is subject to the AD conversion and stored in the line memory 2 (HCG/FD reset noise).

At time t4, the transmission transistor (TX1L) and the transmission transistor (TX2L) are turned on, so that the left partial binning data for the photographing plane phase difference AF in the HCG state is acquired, subject to the AD conversion, and stored in a line memory 3 (HCG/L partial binning data for phase difference AF).

Furthermore, by subtracting the HCG·FD reset noise stored in the line memory 2 from the HCG·L partial binning data for phase difference AF stored in the line memory 3, it is possible to acquire the L partial binning data for the phase difference AF in the HCG state from which the reset noise has been removed (noise-removed·HCG·L partial binning data for phase difference AF).

At time t5, the transmission transistor (TX1L·TX1R) and the transmission transistor (TX2L·TX2R) are turned on, and the partial binning data in the HCG state is acquired, subject to the AD conversion and stored in the line memory 3 (HCG·partial binning data).

By subtracting the HCG/FD reset noise stored in the line memory 2 from the HCG/partial binning data stored in the line memory 3, it is possible to acquire the partial binning data in the HCG state from which the reset noise has been removed (noise-removed/HCG/partial binning data).

In addition, by subtracting the noise-removed·HCG·L partial binning data for phase difference AF from the noise-removed·HCG·partial binning data, the noise-removed·HCG·R partial binning data for phase difference AF may be acquired.

At time t6, the switching transistor (X) is turned on, and in the state (LCG) where the charge-voltage conversion gain of the floating diffusion region (FD) decreases, the transmission transistor (TX1L·TX1R) and the transmission transistor (TX2L·TX2R) are turned on, and the partial binning data in the LCG state is acquired, subject to the AD conversion, and stored in the line memory 3 (LCG·partial binning data).

Next, by subtracting the LCG·FD reset noise stored in the line memory 1 from the LCG·partial binning data stored in the line memory 3, it is possible to acquire the partial binning data in the LCG state from which the reset noise has been removed (noise-removed·LCG·partial binning data).

At time t7, the transmission transistors (TX1L·TX1R–TX4L·TX4R) are turned on, and the full binning data in the LCG state is acquired, subject to the AD conversion and stored in the line memory 3 (LCG·full binning data).

At time t8, by subtracting the LCG·FD reset noise stored in the line memory 1 from the LCG·full binning data stored in the line memory 3, it is possible to acquire the full binning data in the LCG state from which the reset noise has been removed (noise-removed·LCG·full binning data).

In this way, in the HCG state, the L partial binning data for the phase difference AF and the partial binning data (equivalent to the first partial binning data p1) are taken out from the image sensor 10, and in the LCG state, the partial binning data (equivalent to the first partial binning data p1) and the full binning data (equivalent to the full binning data a1) are taken out. Furthermore, as described above, in the HCG state, the R partial binning data for the phase difference AF may be acquired by calculation.

As described above, according to the photographing device equipped with the image sensor of the second embodiment of the present disclosure and the control method, the partial binning data (equivalent to the first partial binning data p1) and the full binning data (equivalent to the full binning data a1) are taken out in the LCG state. Therefore, as in the first embodiment of the present disclosure, it is possible to generate the image while appropriately removing the Moire fringes. By appropriately removing the Moire fringes for the high-SNR data in the LCG state, the Moire fringes may be prevented from being generated in fine images.

In addition, in this embodiment, the full binning data is not read in the HCG state, but when the transmission transistors (TX1L·TX1R–TX4L·TX4R) are turned on in the HCG state, the full binning data in the HCG state may be acquired and subject to the AD conversion, and also the HCG·full binning data may be acquired. Since the switching of the transistor or the AD conversion processing imposes a load on the processor included in the photographing device 100, it is possible to suppress the increase of the load imposed on the processor included in the photographing device 100 and the power consumption of the processor by reducing the number of times of the switching of the transistor or the AD conversion.

In addition, in this embodiment, the partial binning data for the phase difference AF in the HCG state may be acquired. The data for the phase difference AF may need the high SNR, which is very effective because the data in the anti-noise HCG state may be acquired.

Furthermore, in this embodiment, the binning data for the phase difference AF cannot be acquired in the LCG state, but the signal for the phase difference AF may also be acquired by setting a dedicated pixel in the image sensor, masking a part of the pixel, or using a (2×1) on-chip microlens structure.

Figure 13:
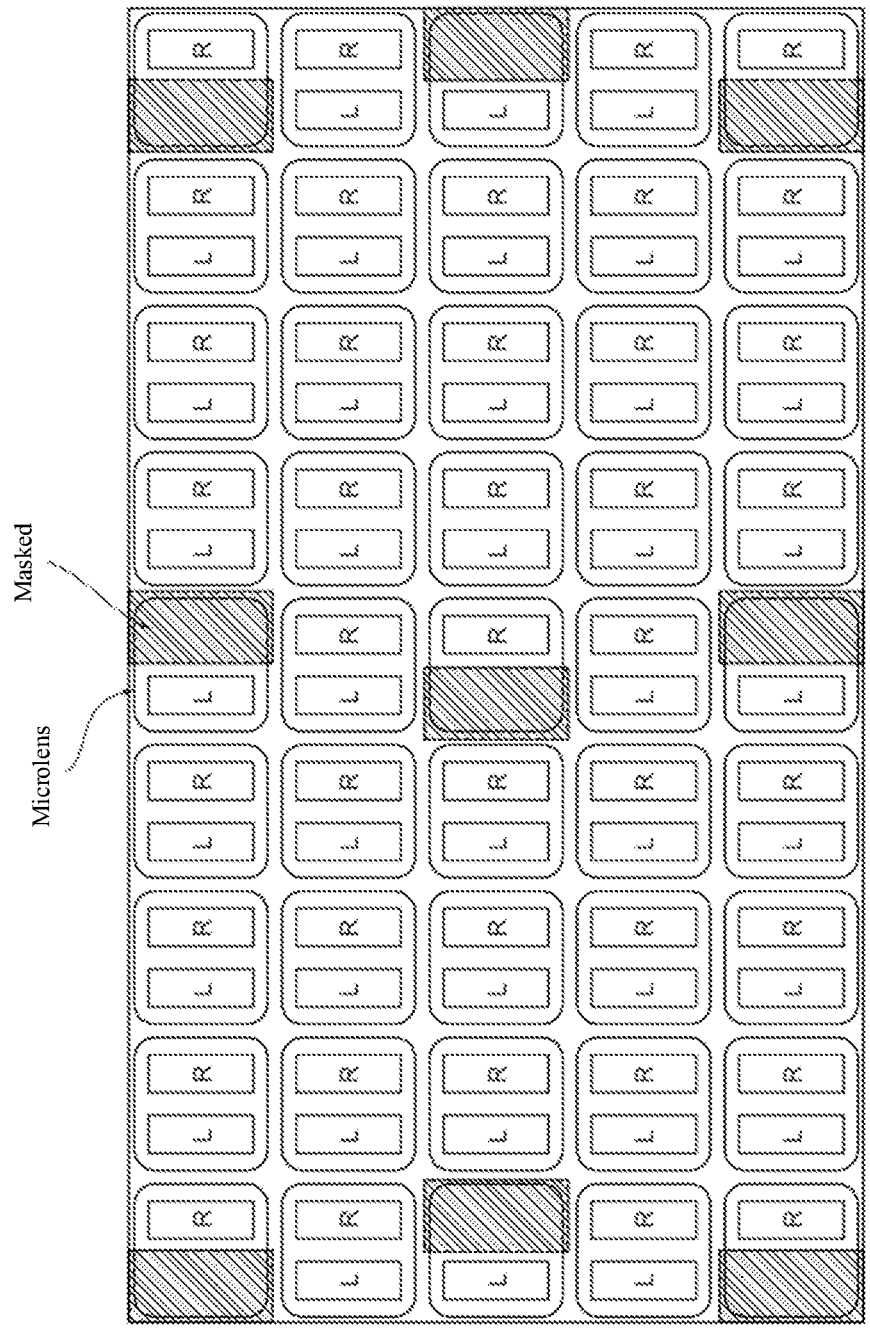
FIG. 13 is a schematic diagram illustrating an image sensor provided with a dedicated pixel in order to acquire a signal for a phase difference AF.

FIG. 13 is a schematic diagram illustrating an image sensor provided with a dedicated pixel in order to acquire a signal for a phase difference AF. As shown in FIG. 13, the dedicated pixel is set among a plurality of pixels arranged in the image sensor, and for example, a left half (L region) or a right half (R region) of the dedicated pixel is masked. In addition, here, the dedicated pixel is divided into the left and right two regions, however the present disclosure is not limited to this. For example, the dedicated pixel may be divided into upper and lower two or three or more regions for masking, so that the phase signal for the phase difference AF may be acquired appropriately.

In the dedicated pixel, in the LCG state, if the phase difference signal is acquired in the unmasked region in an optical manner, the LCG·for phase difference AF data may be acquired.

The embodiments described above are for the convenience of understanding the present disclosure, and are not for the purpose of explaining the present disclosure in a limited way. The elements of the embodiments and their configurations, materials, conditions, shapes and dimensions are not limited to the illustrated elements, and may be changed appropriately. In addition, the configurations shown in different embodiments may be partially replaced or combined.

The invention claimed is:

1. A photographing device, comprising:
  a processor; and
  a memory storing machine-readable instructions that, when executed by the processor, cause the processor to:
  acquire first partial binning data based on a first pixel group, wherein the first pixel group is formed by binning at least one pixel in a unit pixel group composed of a plurality of grouped pixels;
  analyze a frequency characteristic of an image signal of a region composed of the unit pixel group based on a cross-correlation between the first partial binning data and second partial binning data based on a second pixel group composed of pixels other than the first pixel group in the unit pixel group; and
  remove Moire fringes on an image based on an analysis result, wherein the image is generated based on the image signal of the region composed of the unit pixel group.

2. The photographing device according to claim 1, wherein,
  the processor is configured to remove high-frequency components of the image signal through a low-pass filter, so as to remove the Moire fringes.

3. The photographing device according to claim 1, wherein,
  the processor is configured to remove the Moire fringes based on an image signal of a region composed of another unit pixel group near the unit pixel group.

4. The photographing device according to claim 1, wherein,
  the processor is configured to:
  acquire full binning data based on all pixels composing the unit pixel group, and
  subtract the first partial binning data from the full binning data to acquire the second partial binning data.

5. The photographing device according to claim 1, further comprising:
  a common floating diffusion region; and
  photodiodes corresponding to the plurality of grouped pixels and connected to the common floating diffusion region.

6. The photographing device according to claim 5, wherein,
  the floating diffusion region is configured to switch between a plurality of charge-voltage conversion gains, and
  the processor is configured to:
  acquire the first partial binning data at a low conversion gain of the plurality of charge-voltage conversion gains;
  analyze the frequency characteristic of the image signal of the region composed of the unit pixel group based on the cross-correlation between the first partial binning data and the second partial binning data at the low conversion gain; and
  remove the Moire fringes in the region composed of the unit pixel group based on the analysis result at the low conversion gain.

7. The photographing device according to claim 1, wherein,
  each of the plurality of grouped pixels is composed of at least two sub-pixels,
  the processor is configured to acquire, in the at least two sub-pixels, first sub-partial binning data based on a first sub-pixel group formed by binning at least one sub-pixel and second sub-partial binning data based on a second sub-pixel group composed of sub-pixels other than the first sub-pixel group, and
  the first sub-partial binning data and the second sub-partial binning data are configured for phase difference autofocus.

8. The photographing device according to claim 1, wherein,
  each of the plurality of grouped pixels is composed of at least two sub-pixels,
  the plurality of pixels comprise a masked pixel in which part of the at least two sub-pixels is masked,
  the processor is configured to acquire sub-partial binning data based on sub-pixels other than the masked part in the masked pixel, and the sub-partial binning data is configured for phase difference autofocus.

9. A photographing device, comprising:
a processor; and
a memory storing machine-readable instructions that, when executed by the processor, cause the processor to:
acquire first partial binning data based on a first pixel group, wherein the first pixel group is formed by binning at least one pixel in a unit pixel group composed of a plurality of grouped pixels;
analyze a frequency characteristic of an image signal of a region composed of the unit pixel group based on a cross-correlation between the first partial binning data and second partial binning data based on a second pixel group composed of pixels other than the first pixel group in the unit pixel group; and
recover high-frequency components in the region composed of the unit pixel group based on an analysis result and generate an image.

10. A control method, executed by a processor comprised in a photographing device, comprising:
a data acquisition step, wherein first partial binning data based on a first pixel group is acquired, and the first pixel group is formed by binning at least one pixel in a unit pixel group composed of a plurality of grouped pixels;
an analysis step, wherein a frequency characteristic of an image signal of a region composed of the unit pixel group is analyzed based on a cross-correlation between the first partial binning data and second partial binning data based on a second pixel group composed of pixels other than the first pixel group in the unit pixel group; and
a Moire fringe removal step, wherein Moire fringes in the region composed of the unit pixel group are removed based on an analysis result.

11. The control method according to claim 10, wherein, the Moire fringe removal step comprises removing high-frequency components of the image signal through a low-pass filter, so as to remove the Moire fringes.

12. The control method according to claim 10, wherein, the Moire fringe removal step comprises removing the Moire fringes based on an image signal of a region composed of another unit pixel group near the unit pixel group.

13. The control method according to claim 10, further comprising:
acquiring full binning data based on all pixels composing the unit pixel group; and
subtracting the first partial binning data from the full binning data to acquire the second partial binning data.

14. The control method according to claim 10, wherein the photographing device further comprises a floating diffusion region configured to switch between a plurality of charge-voltage conversion gains, and
the control method further comprises:
acquiring the first partial binning data at a low conversion gain of the plurality of charge-voltage conversion gains;
analyzing the frequency characteristic of the image signal of the region composed of the unit pixel group based on the cross-correlation between the first partial binning data and the second partial binning data at the low conversion gain; and
removing the Moire fringes in the region composed of the unit pixel group based on the analysis result at the low conversion gain.

15. The control method according to claim 10, wherein, each of the plurality of grouped pixels is composed of at least two sub-pixels,
the control method further comprises acquiring, in the at least two sub-pixels, first sub-partial binning data based on a first sub-pixel group formed by binning at least one sub-pixel and second sub-partial binning data based on a second sub-pixel group composed of sub-pixels other than the first sub-pixel group, and
the first sub-partial binning data and the second sub-partial binning data are configured for phase difference autofocus.

16. The control method according to claim 10, wherein, each of the plurality of grouped pixels is composed of at least two sub-pixels,
the plurality of grouped pixels comprise a masked pixel in which part of the at least two sub-pixels is masked,
the control method further comprises acquiring sub-partial binning data based on sub-pixels other than the masked part in the masked pixel, and
the sub-partial binning data is configured for phase difference autofocus.

* * * * *